United States Patent Office 2,719,843
Patented Oct. 4, 1955

2,719,843

METHOD OF SYNTHESIZING NUCLEOSIDES AND ANALOGOUS COMPOUNDS AND COMPOUNDS PREPARED THEREBY

John Davoll, London, England, and George B. Brown, Mamaroneck, N. Y., assignors, by mesne assignments, to the United States of America as represented by the United States Atomic Energy Commission No Drawing. Application October 24, 1951, Serial No. 252,984

13 Claims. (Cl. 260—211.5)

The present invention relates to a method of synthesizing glycosyl derivatives of heterocyclic compounds containing an unsubstituted cyclic imino group.

Nucleosides and their analogues are becoming increasingly important in the study and control of body processes. One of the analogous compounds 1-D-ribofuranosyl-5,6-dimethylbenzimidazole ($\alpha$ or $\beta$-isomer) has recently been discovered to evince a vitamin $B_{12}$-like response in rats. Some of the nucleosides show blood pressure depressing properties. For example, 2-chloroadenosine exhibits a very strong and relatively long-lived depressant action when compared to adenosine whereas 2-acetamidoadenosine exhibits an even more prolonged blood pressure depressing action but at a relatively low level when compared to adenosine. Several of the nucleosides are important in reactions occurring within the cells of plants and animals and it is expected that the synthesis and use of these compounds will become increasingly important. In general, distinctions between these compounds occur in either or both of two groups or moieties and the present invention is directed toward a method of combining these groups in numerous combinations. One of the groups is a heterocyclic compound containing an unsubstituted cyclic imino group and the other is a carbohydrate group of the glycosyl type. Prior to the present invention, preparation of compounds comprising these two moieties joined chemically were largely impractical because of the relatively large number of steps involved and the small yields of product formed.

It is accordingly one of the objects of the present invention to provide a relatively simplified method for synthesizing glycosyl derivatives of heterocyclic compounds containing an unsubstituted cyclic imino group.

Another object of the present invention is to prepare nucleosides and analogous compounds in relatively high yield.

It is still another object of the present invention to prepare new glycosyl derivatives of heterocyclic compounds containing an unsubstituted imino group in a cyclic configuration.

Still another object of the present invention is to provide a method of preparing nucleosides which are "tagged" with a radioactive or heavy atom such as carbon[14] or nitrogen[15].

Other objects and advantages will be in part obvious and in part pointed out hereinafter.

In one of its broader aspects the method of the present invention comprises reacting the halomercuri derivative of a heterocyclic compound containing an unsubstituted cyclic imino group with an acylglycosyl halide in a heated inert solvent to substitute the acylglycosyl radical for the halomercuri radical on the imino nitrogen.

Within this broader scope of the method are included numerous reactions useful in the production of nucleosides and analogous compounds. A number of specific examples are set forth to illustrate the method of the present invention but it will be understood that these examples are given for illustrative purposes and that the scope of the present invention is not limited thereto.

Example 1.—1-glycosyl benzimidazoles

A solution of benzimidazole and sodium hydroxide in hot 10 per cent aqueous ethanol containing one gram of a benzimidazol per 100 milliliters of ethanol and one equivalent of sodium hydroxide, was treated with an ethanolic solution of one molecular proportion of mercuric chloride. After cooling, the white precipitate was collected, washed with water and dried. A yield of about 90 to 100 per cent was obtained. The chloromercuri product formed was finely powdered and suspended in xylene to make a composition of about one gram to 80 milliliters. The suspension was dried by slow distillation of one-third of the xylene and a slight excess of triacetyl-D-ribofuranosyl chloride or tetraacetylglucosyl bromide was added to the residual suspension. The mixture was refluxed gently for 1.5 to 2 hours, then cooled and diluted with two volumes of petroleum ether having a boiling point between 30 and 60° C. The precipitate formed was washed with petroleum ether, dried and extracted with cold chloroform. The extract was washed with 30 per cent aqueous potassium iodide and with water, then dried over sodium sulfate and evaporated under reduced pressure to a syrup. The syrup was dissolved in methanol and then treated with an excess of methanolic ammonia formed by saturating methanol with ammonia at 0° C. The solution was refrigerated overnight and then evaporated to dryness. The residual glycosyl benzimidazole was then crystallized from water or dilute aqueous ethanol.

The preparation of 1-$\beta$-D-ribofuranosylbenzimidazole from benzimidazole according to this procedure may be represented diagrammatically as follows:

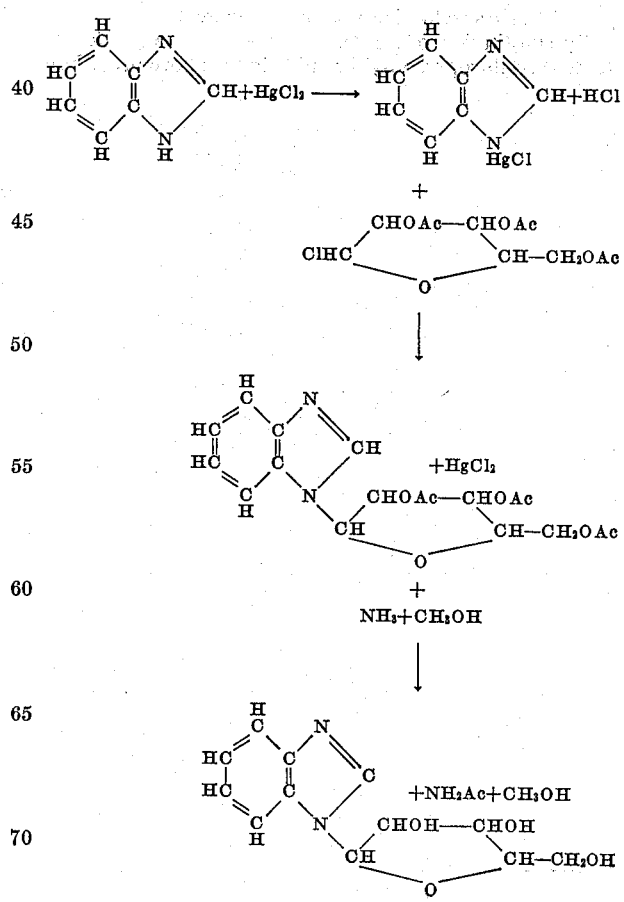

Example 2.—2,6-diacylamido-9-tetraacetyl-β-D-glucopyranosylpurine

A mixture of 0.80 gram of 2,6-diaminopurine and 5.0 grams of benzoic anhydride was heated over a free flame until a clear melt was obtained and for a further 15 minutes. The cooled mixture was boiled with 75 milliliters of ethanol and allowed to stand, when the compound, 2,6-dibenzamidopurine, was obtained as a mass of fine needles at a yield of approximately 79 per cent. This 2,6-diacylamidopurine was re-dissolved in an ethanol-acetone mixture and recrystallized. The recrystallized 2,6-dibenzamidopurine may then be converted through the chloromercuri intermediary as described in Example 1 to 2,6 - dibenzamido - 9 - tetraacetyl-β-D-glucopyranosylpurine.

The same procedure may be carried forward from the recrystallization of the 2,6-diacylamidopurine, but using 2,6-diacetamidopurine in place of the 2,6-dibenzamidopurine formed above, as follows: A recrystallized 2,6-diacetamidopurine was dissolved in boiling 50 per cent ethanol and treated with one equivalent of sodium hydroxide followed immediately by an ethanolic solution of one molecular proportion of mercuric chloride. The precipitate was collected after cooling, dried in vacuo at room temperature and finely powdered. The yield was approximately 90 per cent chloromercuri-2,6-diacetamidopurine. The derivative was dried by azeotropic distillation with xylene and then refluxed with tetraacetyl-glucosyl bromide in 50 milliliters of xylene for about one hour. The product was isolated by first evaporating to about 30 milliliters and then treating the solution with about 150 milliliters of a petroleum ether having a boiling point of between 30 and 60° C. The precipitate was collected and dried and then extracted with 60 milliliters of warm chloroform in 3 portions. The extract was washed with 30 per cent aqueous potassium iodide solution and with water. It was then dried over sodium sulfate and evaporated to dryness. Approximately 0.85 gram (60 per cent) of the 2,6-diacetamido-9-tetraacetyl-β-D-glucopyransylpurine was thus prepared.

By substitution of triacetyl ribofuranosyl chloride for tetraacetylglucopyranosyl bromide in the above procedure the 2,6-diacetamido-9-triacetyl-β-D-ribofuranosylpurine was obtained in 57 per cent yield.

The above products may be converted to 2,6-diamino-9-β-D-glucopyranosylpurine or 2-acetamido-6-amino-9-β-glucopyransylpurine and the corresponding ribofuranosylpurines depending on the agent used in the deacetylation.

2,6-diamino-9-β-D-glucopyranosylpurine

A solution of 2,6-diacetamido-9-tetraacetyl-β-D-glucopyranosylpurine in 30 milliliters of boiling methanol was treated with a hot solution of 0.36 gram of sodium in 30 milliliters of methanol. The mixture was kept overnight at room temperature, then refluxed for 30 minutes, neutralized with acetic acid and evaporated to dryness. Crystallization of the residue from 6 milliliters of water yielded a 92 per cent yield of product.

The corresponding 2,6-diamino-9-β-D-ribofuranosylpurine prepared by the above described procedure can be converted, by treatment with nitrous acid, into the natural nucleoside, crotonoside.

2-acetamido-6-amino-9-β-D-glucopyranosylpurine

A solution of 1.0 gram of 2,6-diacetamido-9-tetraacetyl-β-D-glucopyranosylpurine in 20 milliliters of boiling methanol was cooled rapidly to room temperature and treated with 40 milliliters of methanol which had been saturated with ammonia at 0° C. The mixture was kept overnight at 0° C., then evaporated to dryness and the crystalline residue recrystallized from 8 milliliters of water to give a 79 per cent yield of the product.

The corresponding 2-acetamido-6-amino-9-β-D-ribofuranosylpurine can be converted, prepared by the above described procedure, by treatment with nitrous acid and subsequent deacetylation, into the natural nucleoside, guanosine.

The alternative reactions of Example 2 for the preparation of guanosine and crotonoside from 2,6-diamino purine by combination with triacetyl ribofuranosyl chloride may be diagrammatically illustrated as follows:

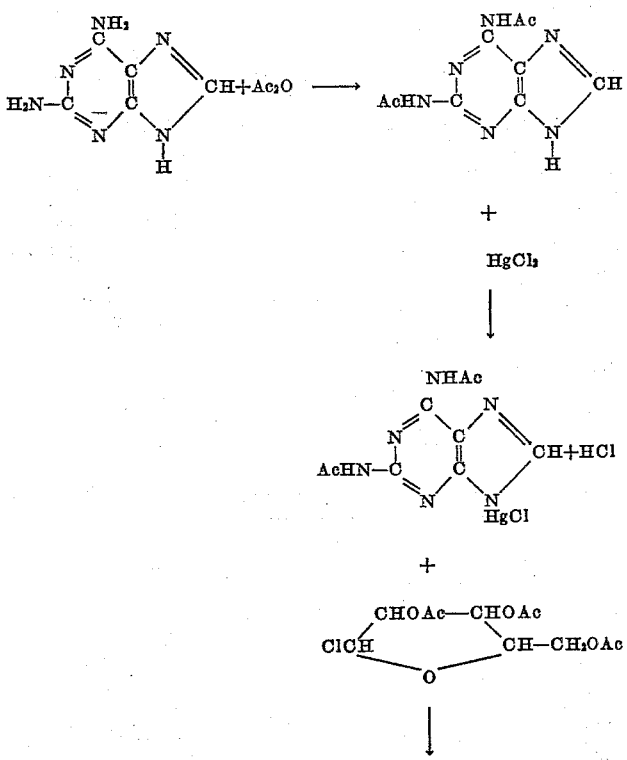

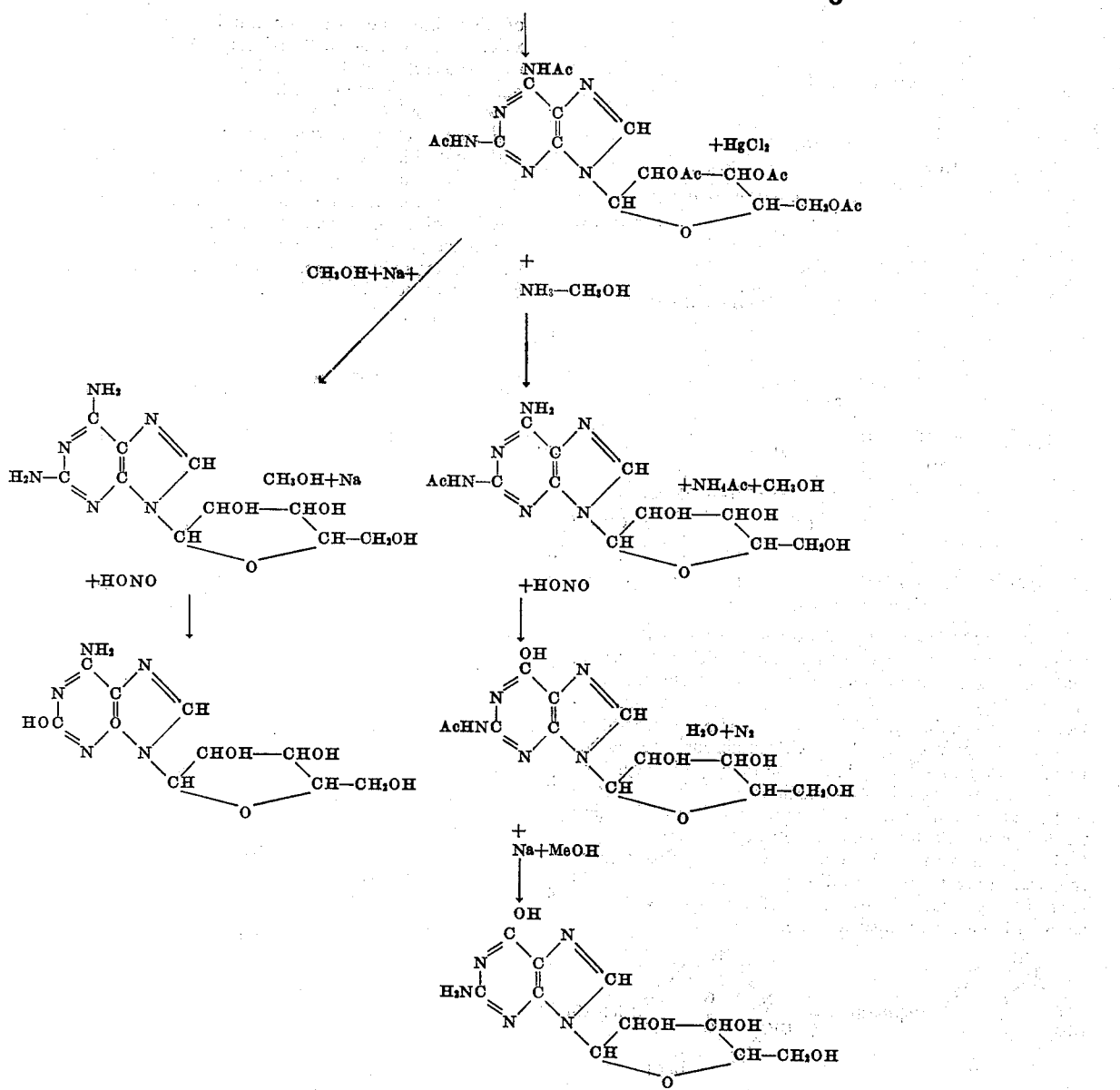

*Example 3.—Adenosine*

A mixture of 1.35 grams of adenine and 8 milliliters of acetic anhydride was refluxed for 3 hours, cooled and the crystalline product collected and washed with ether. A yield of approximately 89 per cent was obtained. The product was dissolved in boiling 50 per cent ethanol and treated with one equivalent of sodium hydroxide followed immediately by an ethanolic solution of one molecular proportion of mecuric chloride. The precipitate was collected after cooling, dried in vacuo at room temperature and finely powdered. A yield of approximately 88 per cent was obtained. 1.78 grams of the chloromercuri derivative was refluxed with triacetyl-D-ribofuranosyl chloride (prepared from 1.7 grams of the tetraacetate) in 85 milliliters of xylene for one hour. Without filtering, the mixture was evaporated to about 30 milliliters and treated with 150 milliliters of petroleum ether having a boiling point between 30 and 60° C. The precipitate was collected and dried, then extracted with 60 milliliters of warm chloroform in 3 portions. The extract was washed with 30 per cent aqueous potassium iodide solution and with water, then dried over sodium sulfate and evaporated to a syrupy consistency. Deacetylation of the syrupy tetraacetyl compound with methanolic ammonia and crystallization of the product from water gave, after working up the mother liquors, a total of 0.307 gram (27 per cent) of adenosine.

The above described reaction may be illustrated diagrammatically as follows:

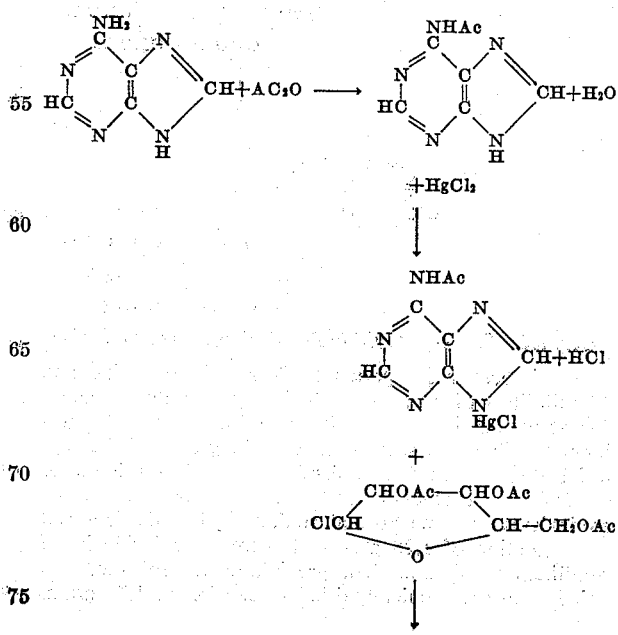

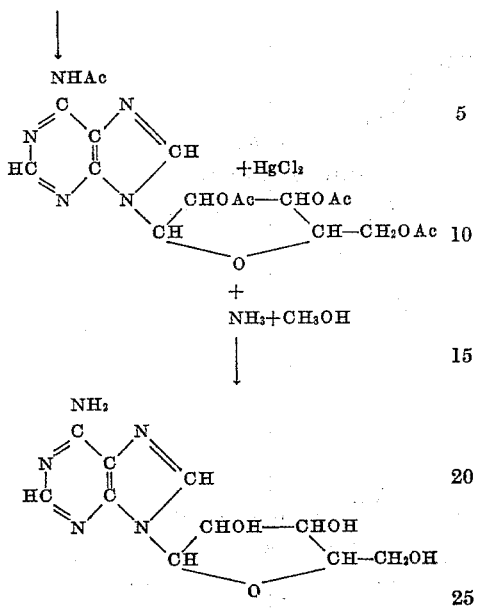

*Example 4.—2,8 - dichloro - 9 - tetraacetyl - β - D-glucopyranosyladenine*

2,8-dichloroadenine was dissolved in hot water containing one equivalent of sodium hydroxide and treated with one molecular proportion of mercuric chloride in a small volume of hot ethanol. The precipitate was collected after cooling, dried in vacuo at room temperature and finely powdered. The chloromercuri derivative (1.87 grams) and 1.90 grams of tetraacetylglucosyl bromide were refluxed in 40 milliliters of xylene for one hour. The resulting yellow solution was then cooled and treated with 250 milliliters of petroleum ether having a boiling point between 30 and 60° C. Crystallization of the precipitate from 10 milliliters of glacial acetic acid gave 1.06 grams (47 per cent) of 2,8-dichloro-9-tetraacetyl-β-D-glucopyranosyladenine.

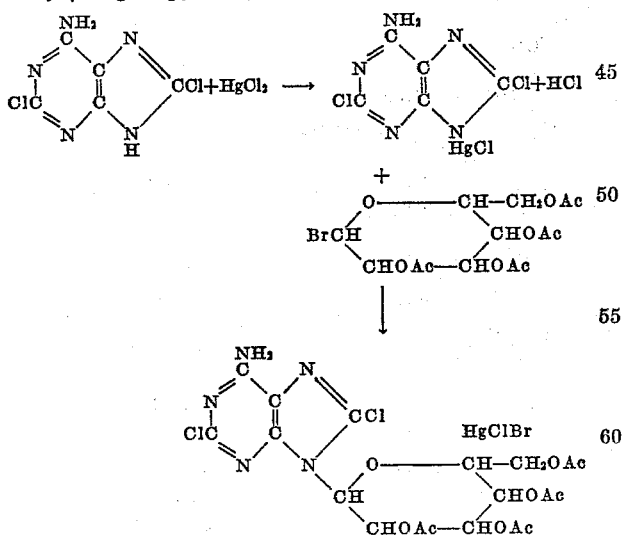

*Example 5.—2-methylthio-9-β-D-ribofuranosyladenine*

A mixture of 1.8 grams of 2-methylthioadenine and 12 milliliters of an acetic anhydride was refluxed gently for about 2.5 hours, cooled and diluted with 12 milliliters of ether. A suspension of 1.24 grams of the material thus obtained was dissolved in 60 milliliters of hot 50 per cent ethanol and treated with 9.4 milliliters (2 equivalents) of one normal sodium hydroxide followed by a solution of 1.28 grams of mercuric chloride in 15 milliliters of ethanol. The precipitate was collected and dried. An azeotropically-dried suspension of 1.73 grams of the chloromercuri compound in 120 milliliters of xylene was treated with triacetyl-D-ribofuranosyl chloride and refluxed for two hours. After cooling, 250 milliliters of petroleum ether having a boiling point between 30 and 60° C. was added and the solid material collected. This material was then dried and extracted with cold chloroform. The extract was washed with 30 per cent aqueous potassium iodide solution and with water. It was then dried over sodium sulfate and evaporated to give the tetraacetyl derivative as a syrup. This was deacetylated with methanolic ammonia and the product was crystallized from 50 milliliters of water. This compound melted at 227° C.

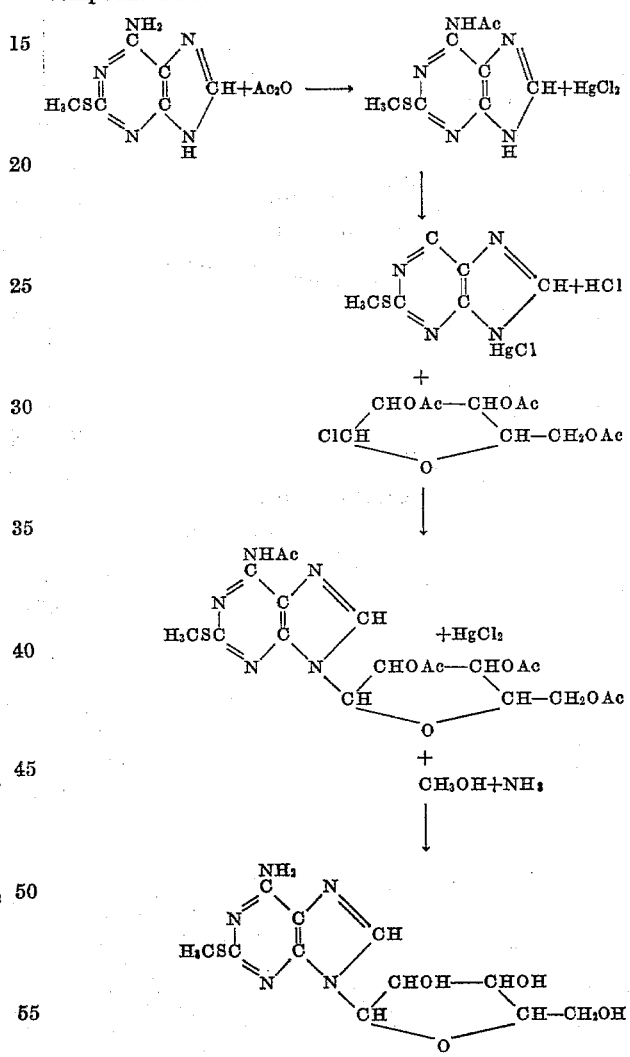

*Example 6.—2-chloro-9-β-D-ribofuranosyladenine*

A solution of 0.17 gram of 2-chloroadenine in 10 milliliters of hot water containing one milliliter of one normal sodium hydroxide was treated with 0.27 gram of mercuric chloride in 5 milliliters of ethanol. The chloromercuri compound was collected after cooling as a white powder in a 77 per cent yield. This material was refluxed for 25 hours in 10 milliliters of xylene with triacetyl-D-ribofuranosyl chloride. The product was isolated by treating the solution with about three volumes of petroleum ether having a boiling point between 30 and 60° C. The precipitate was collected and dried and then extracted with 60 milliliters of warm chloroform in three portions. The extract was washed with 30 per cent aqueous potassium iodide solution and with water. It was then dried over sodium sulfate and evaporated to dryness. A solution of the product in boiling methanol was cooled rapidly to room temperature and treated with methanolic ammonia at 0° C. Crystallization of the material which was obtained from water gave 30 milligrams (13 per cent) of 2 - chloro - 9 - β - D - ribofuranosyladenine.

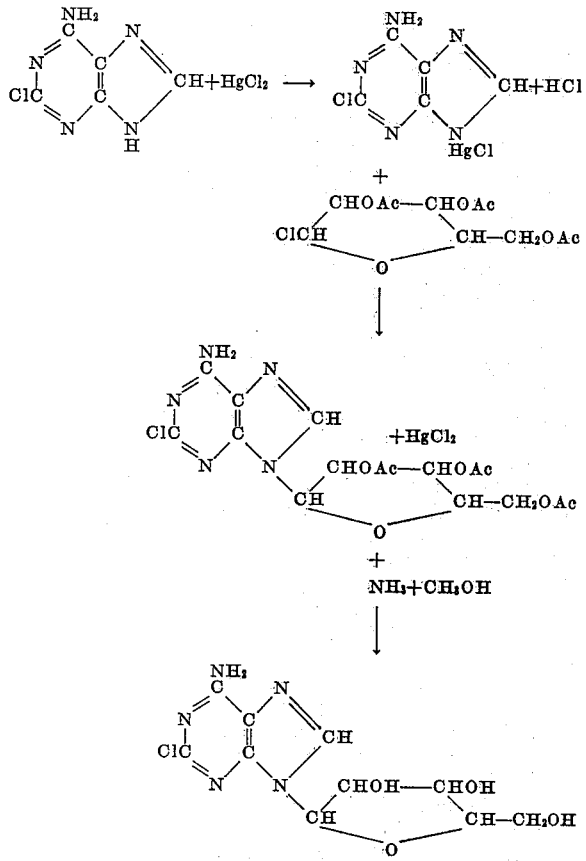

From the foregoing it is apparent that the present invention provides a novel method for preparing a large number of acylglycosyl and glycosyl derivatives of heterocyclic compounds containing an unsubstituted cyclic imino group and analogous compounds. The method comprises a combination of steps for treating and modifying the heterocyclic compound containing the unsubstituted cyclic imino group so that an acylglycosyl group may be joined thereto. It will be apparent to those familiar with this art that many substitutions may be made in the reagents used in certain of the process steps without departing from the scope of the present invention. For example, in the acylation of a heterocyclic compound having active amino groups attached thereto, the acyl anhydride may be selected from such anhydrides as acetic, benzoic, propionic, and others, but the particular anhydrides used in the illustrative example were selected because preferred for the particular reaction. The solution in which the chloromercuri derivative is formed may be rendered alkaline by the use of alkaline agents such as sodium acetate or potassium hydroxide rather than the sodium hydroxide used. Also where the ethanol is used as a solvent in preparing the chloromercuri derivative it is apparent that methanol, isopropanol, water and similar polar solvents might be used equally well depending on the solubility of the material to be treated.

The use of xylene as a solvent in the present invention is not critical. Other inert solvents of suitable high boiling point, for example, toluene and similar aromatic hydrocarbons may be substituted. The use of petroleum ether in isolating the product from the xylene solution is also not critical and related petroleum derivatives, such as hexane, in which the product to be isolated is not more than slightly soluble, can be substituted. The use of glycosyl chloride and bromide in the examples illustrates that these two are interchangeable according to the present method. In addition, although methanolic ammonia is preferred in most instances it is within the scope of the present invention to use ethanolic ammonia or other conventional deacylating reagents.

The washing with potassium iodide is intended to remove dissolved mercury salts and this same operation could be performed with the use of sodium iodide or by precipitating the mercury with hydrogen sulfide after deacylation. Where sodium sulfate is specified in the illustrations, a suitable dessicant such as magnesium sulfate will serve equally well. Carbon tetrachloride or related solvents might be used in place of chloroform as a solvent.

It will thus be seen that the use of the particular reagents given in the illustrations are primarily a matter of preference and that similar reagents such as those outlined above may be used in carrying out the subject method. Although mercuric chloride is preferred in forming the intermediary mercury derivative, the method has been successfully carried out using mercuric acetate. Applicants have found advantage in the use of the chloride in the higher yield obtained, but it is apparent that the anion associated with the mercury cation is not limited to the chloride but may include such other anions as the bromide or iodide.

The present method is illustrated in this application by examples of the preparation of a number of heterocyclic compounds containing an unsubstituted cyclic imino group. However, from the diversity of compounds prepared by this method its particular suitability for such difficult preparations as the preparation of glycosyl derivatives of compounds having ring systems containing an imidazole group with an unsubstituted nitrogen atom in said imidazole is demonstrated. The applicability of this method to at least 40 such compounds having fused ring systems, particularly the imidazolobenzenes and imidazolopyrimidines, has been demonstrated. Such compounds include glycosyl derivatives of 6-acetamidopurine; 6-benzamidopurine; 2,6-diacetamidopurine; 2,6-dibenzamidopurine, 2-methyl-6-acetamidopurine; 2-methylthio-6-acetamidopurine; 2-chloroadenine; 2,8-dichloroadenine; benzimidazole; and 5,6-dimethylbenzimidazole.

The method also has application to combining many more glycosyl moieties than are illustratively given in the examples. The compounds which are particularly useful in the study and control of living processes include both the glycofuranosyl and glycopyranosyl purines. Also for purposes of study and control of living processes ribosyl and xylosyl derivatives are of particular importance. The glycosyl moiety most commonly found associated in naturally occurring nucleosides is the ribofuranosyl group and it is apparent from the examples that the preparation of this important group of compounds has been facilitated by the present invention.

Among the new nucleosides which have been prepared according to the present method are the following:

| Nucleoside: | Melting point |
|---|---|
| 2,6-diamino-9-β-D-ribofuranosyl purine | 245–247° C. |
| 2,6-diamino-9-β-D-ribopyranosyl purine | 188–190° C. |
| 2 - acetamido - 6 - amino - 9 - β - D - ribofuranosyl purine | 140–150° C. |
| 2,6-diamino-9-β-D-glucopyranosyl purine | 301–303° C. |

Since many embodiments might be made of the above described invention and since many changes might be made in the embodiment illustratively disclosed herein, it is to be understood that all matter hereinabove set forth is to be interpreted as illustrative only and not in a limiting sense, except as may be required by the appended claims.

We claim:

1. The method of forming an acylglycosyl derivative of a heterocyclic compound containing an unsubstituted cyclic imino group which comprises reacting the halomercuri derivative having the halomercuri radical on an imino nitrogen of said heterocyclic compound with an acylglycosyl halide in a heated inert solvent to substitute the acylglycosyl radical for the halomercuri radical on the imino nitrogen.

2. The method of forming an acylglycosyl derivative of a heterocyclic compound containing an unsubstituted cyclic imino group which comprises reacting the chloromercuri derivative having the chloromercuri radical on an imino nitrogen of said heterocyclic compound with an acylglycosyl halide selected from the group consisting of acylglycosyl chloride and acylglycosyl bromide in a heated inert solvent to substitute the acylglycosyl radical for the chloromercuri radical on the imino nitrogen.

3. The method of forming an acylglycosyl derivative of a heterocyclic compound containing an unsubstituted cyclic imino group which comprises reacting the chloromercuri derivative having the chloromercuri radical on an imino nitrogen of said heterocyclic compound with an acylglycosyl halide selected from the group consisting of acetylglycosyl halide and benzoylglycosyl halide in a heated inert solvent to substitute the acylglycosyl radical for the chloromercuri radical on an imino nitrogen.

4. The method of forming an acylglycosyl derivative of a heterocyclic compound containing an unsubstituted cyclic imino group which comprises reacting the chloromercuri derivative having the chloromercuri radical on an imino nitrogen of said heterocyclic compound with an acylglycosyl halide selected from the group consisting of acylglycofuranosyl halide and acylglycopyranosyl halide in a heated inert solvent to substitute the acylglycosyl radical for the chloromercuri radical on an imino nitrogen.

5. The method of forming an acylglycosyl derivative of a heterocyclic compound having fused ring systems containing an imidazole group with an unsubstituted nitrogen atom in said imidazole which comprises reacting the chloromercuri derivative having the halomercuri radical on said unsubstituted nitrogen atom of said heterocyclic compound with an acylglycosyl halide in a heated inert solvent to substitute the acylglycosyl radical for the chloromercuri radical on said imidazole nitrogen.

6. The method of forming an acylglycosyl derivative of an imidazole selected from the group consisting of imidazolobenzenes and imidazolopyrimidines which comprises reacting the chloromercuri derivative of said imidazole having the chloromercuri radical on an unsubstituted imidazole nitrogen with an acylglycosyl chloride in a heated inert solvent to substitute the acylglycosyl radical for the chloromercuri radical on an unsubstituted imidazole nitrogen.

7. The method of forming an acylglycosyl derivative of a benzimidazole which comprises reacting the chloromercuri derivative having the chloromercuri radical on an unsubstituted imidazole nitrogen of said benzimidazole with an acylglycosyl halide in a heated inert solvent to substitute the acylglycosyl radical for the chloromercuri radical on an unsubstituted imidazole nitrogen.

8. The method of forming an acylglycosyl derivative of a purine which comprises reacting the chloromercuri derivative having the chloromercuri radical on an imino nitrogen of said purine with an acylglycosyl halide in a heated inert solvent to substitute the acylglycosyl radical for the chloromercuri radical on an imidazole nitrogen.

9. The method of forming an acylglycosyl derivative of an imidazole selected from the group consisting of 6-acetamidopurine; 6-benzamidopurine; 2,6-diacetamidopurine; 2,6-dibenzamidopurine; 2-methyl-6-acetamidopurine; 2-methylthio-6-acetamido purine; 2-chloroadenine; 2,8-dichloroadenine; benzimidazole; 5,6-dimethyl benzimidazole, which comprises reacting the chloromercuri derivative having the chloromercuri radical on an imidazole nitrogen of said imidazole with an acylglycosyl halide in a heated inert solvent to substitute the acylglycosyl radical for the chloromercuri radical on an unsubstituted imidazole nitrogen.

10. The method of forming an acylglycosyl derivative of a compound selected from the group consisting of 6-acetamidopurine; 6-benzamidopurine; 2,6-diacetamidopurine; 2,6-dibenzamidopurine; 2-methyl-6-acetamidopurine; 2-methylthio-6-acetamidopurine; 2-chloroadenine; 2,8-dichloroadenine; benzimidazole; 5,6-dimethylbenzimidazole, which comprises reacting the chloromercuri derivative having the chloromercuri radical on an imino nitrogen of said compound with an acylglycosyl halide selected from the group consisting of triacetyl-D-ribofuranosyl chloride; triacetyl-D-ribopyranosyl chloride; triacetyl-D-xylofuranosyl chloride; and tetraacetyl-D-glucopyranosyl bromide; in a heated inert solvent to replace the chloromercuri radical with the acylglycosyl radical.

11. The method of forming 1-β-D-ribofuranosyl-5,6-dimethylbenzimidazole which comprises reacting 5,6-dimethylbenzimidazole with mercuric chloride in a hot alcoholic solution containing sodium hydroxide, collecting the precipitate, reacting the chloromercuri derivative formed with a slight excess of triacetyl-D-ribofuranosyl chloride in a heated inert solvent, thereafter cooling the solution and adding two volumes of petroleum ether, extracting the product with cold chloroform, removing excess mercury ions, drying and evaporating the chloroform under reduced pressure, thereafter deacylating the product in methanol by reacting it with an excess of methanolic ammonia.

12. The method of forming 2-acetamido-6-amino-9-β-D-glucopyranosylpurine which comprises reacting 2,6-diaminopurine with acetic anhydride to form 2,6-diacetamidopurine, forming the chloromercuri derivative by reacting the product with mercuric chloride in a hot alcoholic solution containing an alkali, reacting the chloromercuri derivative formed with tetraacetylglucosyl bromide in boiling xylene, collecting the product and partially deacetylating by reacting the product with methanolic ammonia.

13. The method of forming 2,6-diamino-9-β-D-glucopyranosylpurine which comprises forming the acetyl derivative by reacting the 2,6-diaminopurine with acetic anhydride, reacting said derivative with mercuric chloride in a heated alkaline ethanolic solution, reacting the chloromercuri derivative with tetraacetylglucosyl bromide in boiling xylene, collecting the product and reacting the product with sodium methylate.

References Cited in the file of this patent

UNITED STATES PATENTS

| | | |
|---|---|---|
| 2,482,069 | Ruskin | Sept. 13, 1949 |
| 2,522,854 | Brink et al. | Sept. 19, 1950 |

FOREIGN PATENTS

| | | |
|---|---|---|
| 281,008 | Germany | Dec. 10, 1914 |

OTHER REFERENCES

Fischer, Ber. 47 (1914), pgs. 214–216.
Pigman-Carbohydrate Chemistry, pgs. 379–383 (1948).